US010868860B2

(12) United States Patent
Akao et al.

(10) Patent No.: US 10,868,860 B2
(45) Date of Patent: Dec. 15, 2020

(54) INFORMATION PROCESSING DEVICE AND INFORMATION PROCESSING SYSTEM

(71) Applicant: FUJITSU LIMITED, Kawasaki (JP)

(72) Inventors: Kazutoshi Akao, Kawasaki (JP); Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 16/271,311

(22) Filed: Feb. 8, 2019

(65) Prior Publication Data

US 2019/0260828 A1 Aug. 22, 2019

(30) Foreign Application Priority Data

Feb. 19, 2018 (JP) ................................ 2018-026691

(51) Int. Cl.

| | |
|---|---|
| ***G06F 15/173*** | (2006.01) |
| ***H04L 29/08*** | (2006.01) |
| ***H04L 12/26*** | (2006.01) |
| ***G06F 9/455*** | (2018.01) |
| ***H04L 12/24*** | (2006.01) |

(52) U.S. Cl.

CPC ...... *H04L 67/1034* (2013.01); *G06F 9/45558* (2013.01); *H04L 41/0813* (2013.01); *H04L 43/0876* (2013.01); *H04L 43/16* (2013.01); *H04L 67/1008* (2013.01); *H04L 67/327* (2013.01); *G06F 2009/4557* (2013.01); *G06F 2009/45595* (2013.01)

(58) Field of Classification Search

CPC ............... H04L 67/101; H04L 67/1002; H04L 67/1008; H04L 67/1097; H04L 47/70; G06F 3/0616; G06F 3/0617

See application file for complete search history.

(56) References Cited

U.S. PATENT DOCUMENTS 6,801,949 B1 * 10/2004 Bruck .............. H04L 29/12009 709/232
7,574,499 B1 * 8/2009 Swildens ............... G06F 9/505 709/202

(Continued)

FOREIGN PATENT DOCUMENTS

JP 2009-117915 5/2009
JP 2009-265778 11/2009

(Continued)

*Primary Examiner* — Yves Dalencourt
(74) *Attorney, Agent, or Firm* — Fujitsu Patent Center

(57) ABSTRACT

An information processing device includes a processor that repeats, for a predetermined time period, transmission of an inspection signal to a first device and reception of load information in response to the inspection signal. The processor calculates, for each load of the first device, a threshold value of a response time based on the load information and a response time. The processor distributes, to the first device and a second device, requests for the first device when a response time of the first device after the predetermined time period elapses exceeds a threshold value corresponding to a load. The processor determines whether to switch from the first device to the second device based on a result obtained by comparing a first load of the first device with a second load of the second device after the requests are distributed to the first device and the second device.

12 Claims, 16 Drawing Sheets

START
301 TRANSMIT INSPECTION SIGNAL
302 RECEIVE RESPONSE AND LOAD INFORMATION
303 CALCULATE THRESHOLD VALUE
304 TRANSMIT INSPECTION SIGNAL
305 RECEIVE RESPONSE AND LOAD INFORMATION
306 DISTRIBUTE REQUESTS
307 DETERMINE WHETHER TO SWITCH
END

(56) References Cited

U.S. PATENT DOCUMENTS

2014/0052864 A1* 2/2014 Van Der Linden ..... H04L 47/70
709/226
2016/0004552 A1* 1/2016 Innan .................. H04L 67/1008
718/1

FOREIGN PATENT DOCUMENTS

JP 2014-534491 12/2014
WO 2013/049236 4/2013

* cited by examiner 403-1
403-2
403-3
CLIENT TERMINAL
CLIENT TERMINAL
CLIENT TERMINAL
404
401
LOAD BALANCER
SERVER
SERVER
SERVER
402-1
402-2
402-3
CPU UTILIZATION: 90%
CPU UTILIZATION: 20%

403-1
CLIENT TERMINAL
403-2
CLIENT TERMINAL
403-3
CLIENT TERMINAL
404
401
LOAD BALANCER
402-1
SERVER
CPU UTILIZATION: 79%
VCPU: 1
MEMORY: 1G
402-2
SERVER
CPU UTILIZATION: 80%
VCPU: 1
MEMORY: 1G
1201
SERVER
VCPU: 2
MEMORY: 2G 403-1
403-2
403-3
CLIENT TERMINAL
CLIENT TERMINAL
CLIENT TERMINAL
404
401
LOAD BALANCER
SERVER
SERVER
SERVER
CPU UTILIZATION: 70%
CPU UTILIZATION: 99%
402-1
402-2
1201

INFORMATION PROCESSING DEVICE AND INFORMATION PROCESSING SYSTEM

CROSS-REFERENCE TO RELATED APPLICATION

This application is based upon and claims the benefit of priority of the prior Japanese Patent Application No. 2018-26691, filed on Feb. 19, 2018, the entire contents of which are incorporated herein by reference.

FIELD

The embodiment discussed herein is related to an information processing device and an information processing system.

BACKGROUND

For an information processing system that processes requests from a plurality of client terminals, there exists a method that implements failover of a server by a load balancer as an availability-enhancing technique.

There are also known a technique by which a plurality of servers are regarded as one virtual server by using a load balancer and a technique by which a health check is conducted for a server or the like.

Related techniques are disclosed in, for example, Japanese Laid-open Patent Publication No. 2009-265778, Japanese National Publication of International Patent Application No. 2014-534491, and Japanese Laid-open Patent Publication No. 2009-117915.

At the time of failover of a server through health check communication by a load balancer, the failover may not be implemented at an appropriate time.

Such a problem also occurs in a case in which another information processing device determines switching of a device that processes requests in addition to the case in which a load balancer implements failover of a server.

SUMMARY

According to an aspect of the present invention, provide is an information processing device including a memory and a processor coupled to the memory. The processor is configured to repeat, for a predetermined time period, transmission of an inspection signal to a first device and reception of load information indicating a load of the first device in response to the inspection signal. The processor is configured to calculate, for each load of the first device, a threshold value of a response time of the first device for an inspection signal based on each piece of the load information received in the predetermined time period and a response time for receiving each piece of the load information. The processor is configured to distribute, to the first device and a second device, requests for the first device when a response time of the first device for receiving load information in response to an inspection signal transmitted after the predetermined time period elapses exceeds a threshold value corresponding to a load indicated by the received load information. The processor is configured to determine whether to switch from the first device to the second device based on a result obtained by comparing a first load indicated by load information received from the first device with a second load indicated by load information received from the second device after the requests are distributed to the first device and the second device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

The embodiment is described below in detail with reference to drawings.

Figure 1:
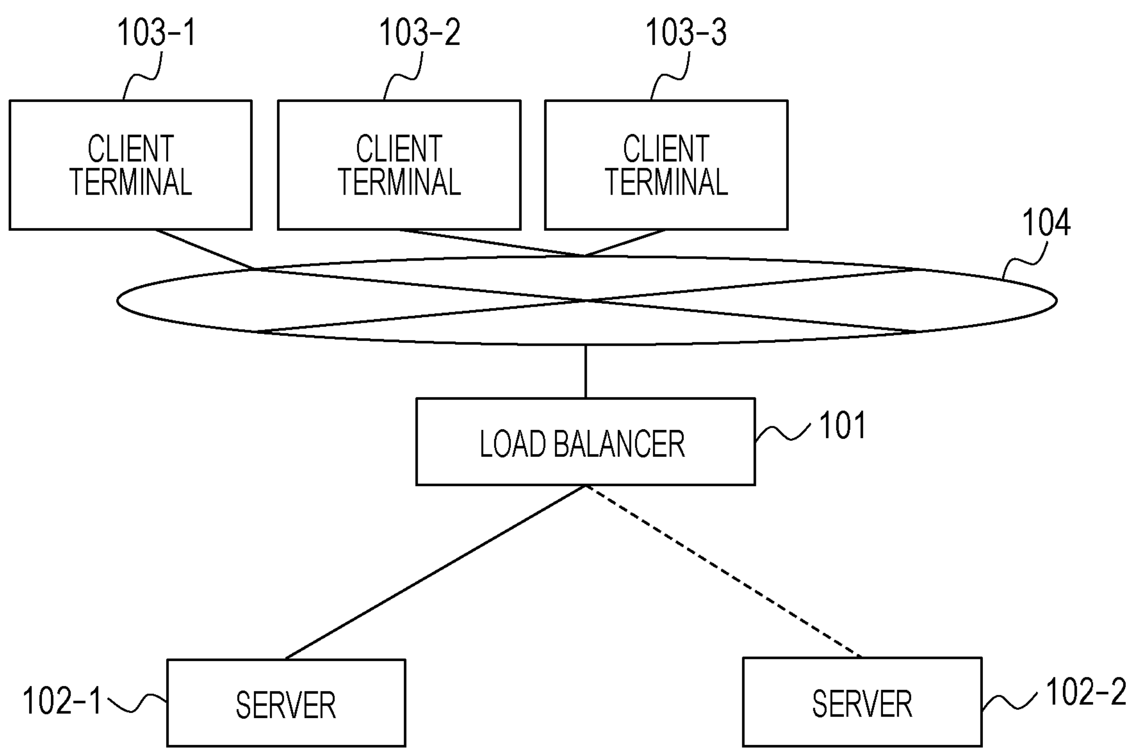
FIG. 1 is a diagram illustrating an exemplary configuration of an information processing system.

FIG. 1 illustrates an exemplary configuration of an information processing system including a load balancer. An information processing system illustrated in FIG. 1 includes a load balancer 101, a server 102-1, and a server 102-2. Client terminals 103-1 to 103-3 communicate with the load balancer 101 through a communication network 104 and transmit requests to the load balancer 101.

The server 102-1 is a working server, and the server 102-2 is a backup server. The load balancer 101 transmits the requests received from the client terminals 103-1 to 103-3 to the server 102-1 and transmits responses received from the server 102-1 to the client terminals 103-1 to 103-3.

The load balancer 101 monitors the health of the server 102-1 by health check communication and implements failover from the server 102-1 to the server 102-2 when the load balancer 101 determines that a failure has occurred in the server 102-1. As a result, the working server is switched from the server 102-1 to the server 102-2, and processing that is being executed by the server 102-1 is handed over to the server 102-2, such that high availability of the system is realized.

When the health check communication is performed, an allowable delay time and an allowable number of consecutive failures are set to a setting file. The allowable delay time represents an allowable value of a response time until the load balancer 101 receives a response to an inspection signal in the health check communication from the server 102-1 after the load balancer 101 has transmitted the inspection signal to the server 102-1. When the response time exceeds the allowable delay time, the load balancer 101 determines that the health check communication has failed.

The allowable number of consecutive failures represents an allowable value of the number of consecutive failures in each of which the health check communication fails. When the number of consecutive failures in each of which the health check communication fails exceeds the allowable number of consecutive failures, the load balancer 101 determines that a failure has occurred in the server 102-1. In this case, the load balancer 101 implements failover and starts transmission of requests to the server 102-2.

There are many cases in each of which the allowable delay time and the allowable number of consecutive failures set to the setting file are fixed values, and therefore, failover is not implemented appropriately in the following cases.

(1) A case in which failover is implemented erroneously due to even application of a small load to the server 102-1 when the allowable delay time is set to be short.

(2) A case in which a service downtime becomes long at the time of occurrence of a failure in the server 102-1 when an allowable delay time is set to be long.

(3) A case in which failover is implemented even when the failover has no effect.

For example, in a case in which the allowable delay time is set at 1 ms, the service downtime may be short because failover is implemented quickly when a failure occurs in the server 102-1. However, even in a case in which a central processing unit (CPU) utilization of the server 102-1 is about 10%, failover may be implemented due to temporary delay of the health check communication because a response time exceeds 1 ms.

On the other hand, when an allowable delay time is set at five minutes, failover is not implemented due to temporary delay of the health check communication; however, the service downtime at the time of occurrence of a failure in the server 102-1 becomes long.

Figure 2:
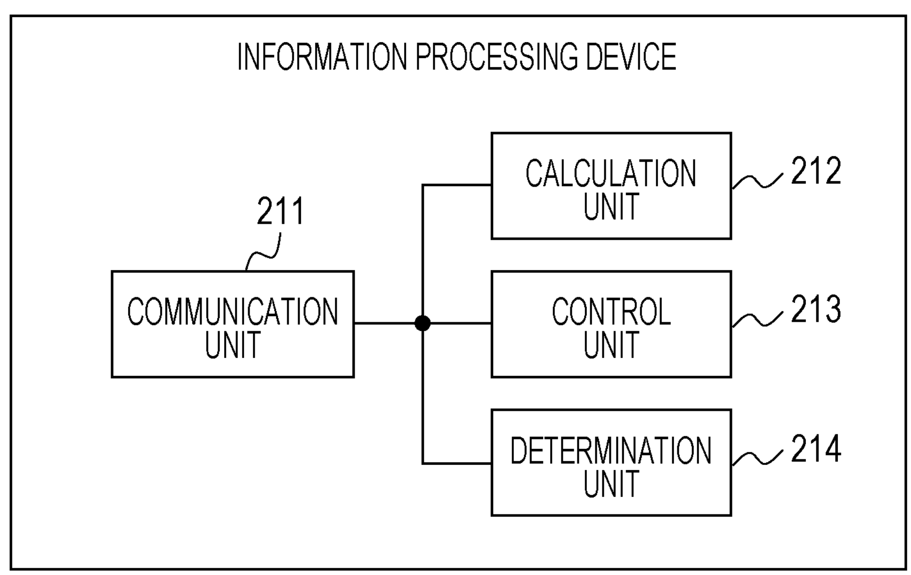
FIG. 2 is a diagram illustrating an exemplary functional configuration of an information processing device.

FIG. 2 illustrates an exemplary functional configuration of an information processing device according to an embodiment. An information processing device 201 in FIG. 2 includes a communication unit 211, a calculation unit 212, a control unit 213, and a determination unit 214.

Figure 3:
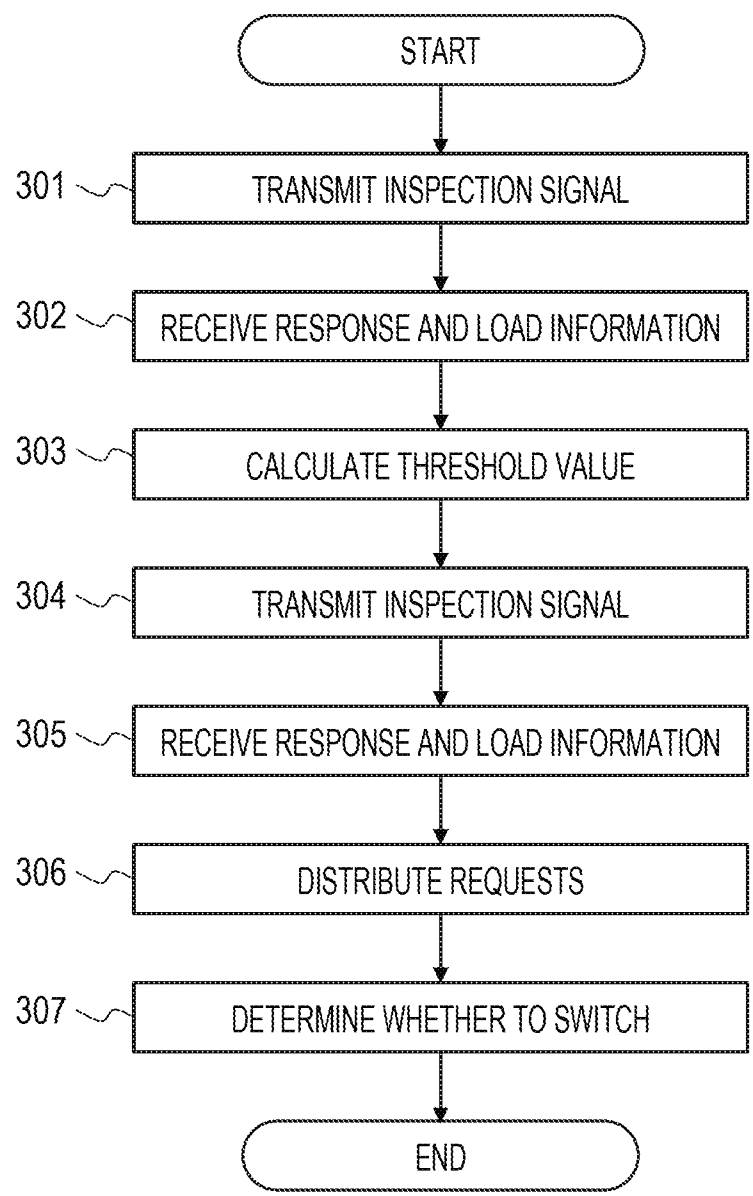
FIG. 3 is a flowchart illustrating control processing.

FIG. 3 is a flowchart illustrating an example of control processing executed by the information processing device 201 in FIG. 2. First, the communication unit 211 transmits an inspection signal to a first device in a predetermined time period (Step 301), and receives, from the first device, a response to the inspection signal and load information indicating a load of the first device (Step 302). The communication unit 211 repeats Steps 301 and 302 in the predetermined time period. Next, the calculation unit 212 calculates a threshold value of a response time of the first device to the inspection signal for each load of the first device in accordance with the load information and the response in the predetermined time period (Step 303).

Next, the communication unit 211 transmits an inspection signal to the first device (Step 304) after the predetermined time period has elapsed and receives a response to the inspection signal and load information indicating a load of the first device from the first device (Step 305). The communication unit 211 repeats Steps 304 and 305 regularly or in response to a predetermined trigger.

When the response time of the first device exceeds a threshold value corresponding to a load of the first device, the control unit 213 distributes requests for the first device to the first device and a second device (Step 306). Next, the determination unit 214 determines switching from the first device to the second device in accordance with a result obtained by comparing a first load indicated by load information received from the first device with a second load indicated by load information received from the second device (Step 307).

In the information processing device 201 in FIG. 2, switching of a device that processes requests may be appropriately performed.

Figure 4:
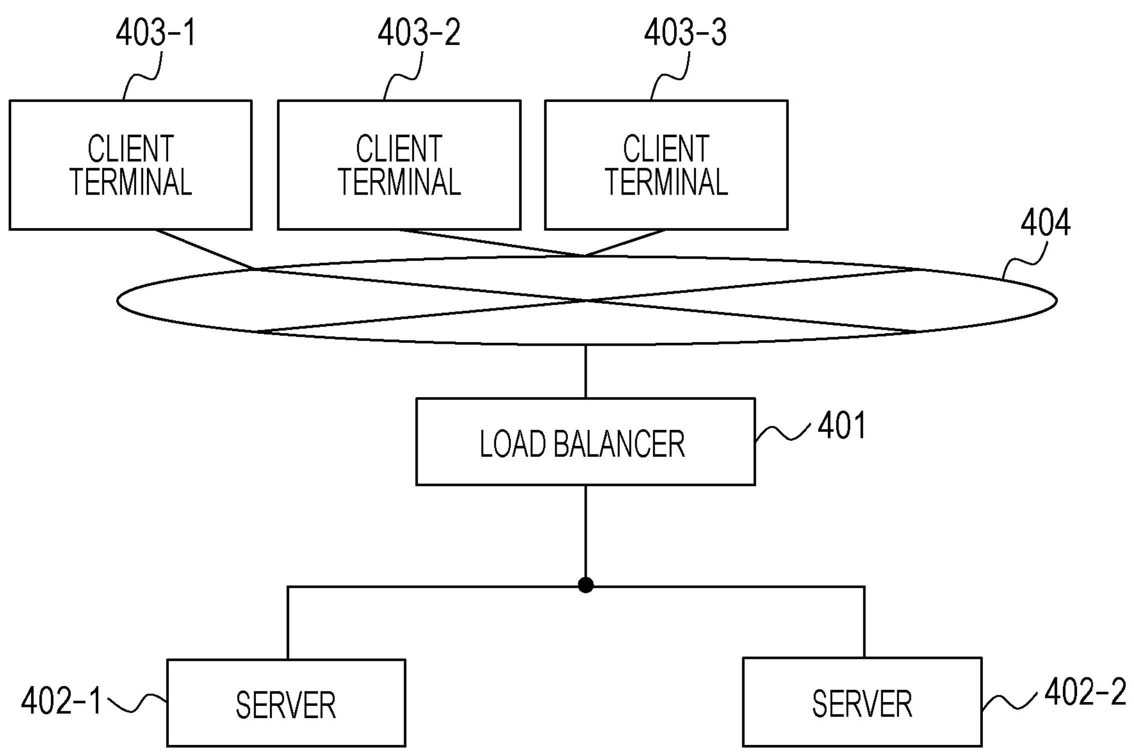
FIG. 4 is a diagram illustrating an exemplary configuration of an information processing system using a variable threshold value.

FIG. 4 illustrates an exemplary configuration of an information processing system using a variable threshold value. An information processing system in FIG. 4 includes a load balancer 401 and servers 402-1 and 402-2, and the load balancer 401 corresponds to the information processing device 201 in FIG. 2.

Client terminals 403-1 to 403-3 communicate with the load balancer 401 through a communication network 404 and transmit requests to the load balancer 401. The number of client terminals is not limited to 3, and may be 2 or less, or 4 or more.

The servers 402-1 and 402-2 respectively correspond to the first and second devices. The server 402-1 is a working server, and a working virtual machine (VM) operates in the server 402-1. The server 402-2 is a backup server, and a backup VM is generated in the server 402-2 before failover is implemented.

The load balancer 401 transmits the requests received from the client terminals 403-1 to 403-3 to the VM of the server 402-1 and transmits responses received from the VM to the client terminals 403-1 to 403-3.

Figure 5:
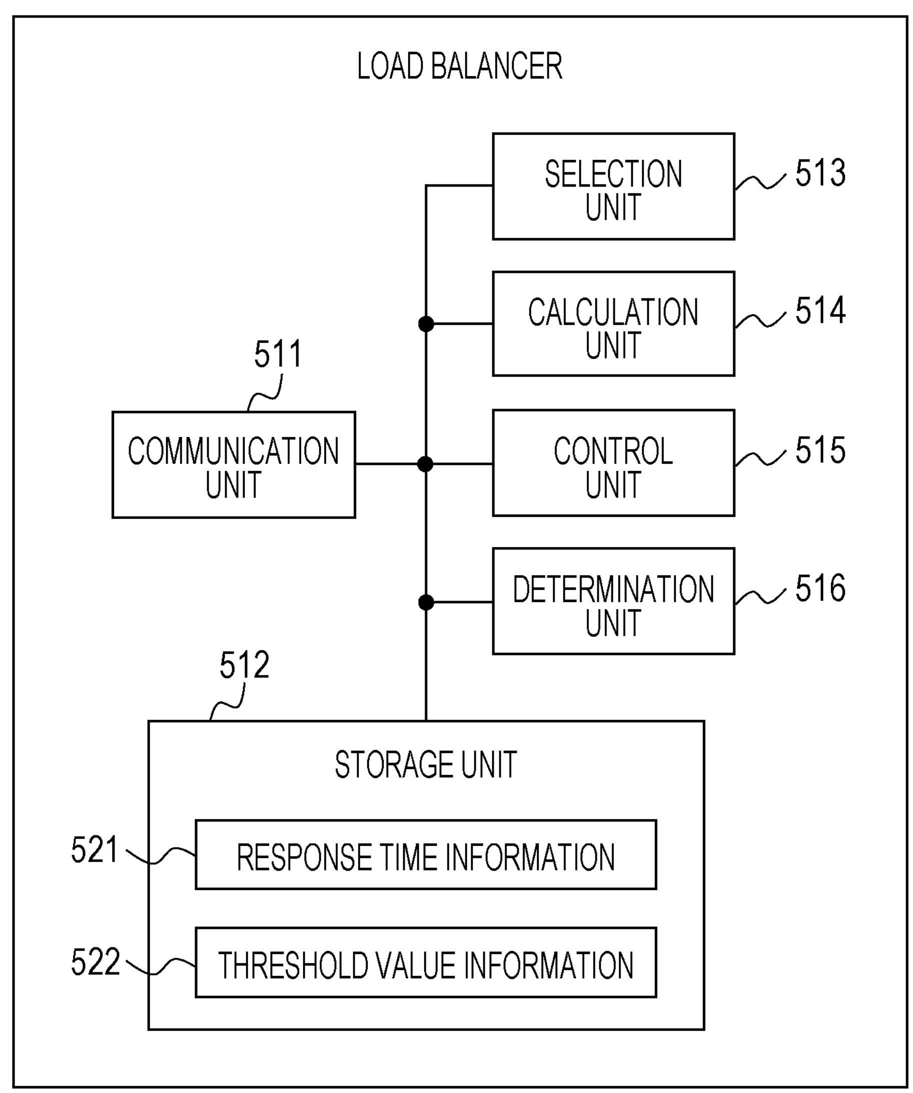
FIG. 5 is a diagram illustrating an exemplary functional configuration of a load balancer.

FIG. 5 illustrates an exemplary functional configuration of the load balancer 401 in FIG. 4. The load balancer 401 in FIG. 5 includes a communication unit 511, a storage unit 512, a selection unit 513, a calculation unit 514, a control unit 515, and a determination unit 516. The communication unit 511, the calculation unit 514, the control unit 515, and the determination unit 516 respectively correspond to the communication unit 211, the calculation unit 212, the control unit 213, and the determination unit 214 in FIG. 2.

In a certain evaluation time period set by a user, the communication unit 511 transmits an inspection signal in health check communication to the server 402-1 and receives, from the server 402-1, a response to the inspection signal and load information indicating a load of the server 402-1. The evaluation time period is set depending on a configuration or a condition of an information processing system, and may be, for example, several days to several weeks. As the load information, a CPU utilization, a disk input/output (I/O) amount, a load average, a traffic amount of a communication network, a memory or swap utilization, or the like, may be used.

The selection unit 513 selects a server 402-2 to which a backup VM is to be deployed and instructs the selected server 402-2 to generates a VM.

The calculation unit 514 generates response time information 521 indicating a change in a response time with respect to a change in a load of the server 402-1, in accordance with a response time of the server 402-1 in the evaluation time period and load information received from the server 402-1 and stores the response time information 521 in the storage unit 512. In addition, the calculation unit 514 calculates a threshold value of a response time for each load by using the response time information 521, generates threshold value information 522 indicating the calculated threshold values, and stores the threshold value information 522 in the storage unit 512.

Even after the evaluation time period has elapsed, the communication unit 511 transmits an inspection signal to the server 402-1 and receives, from the server 402-1, a response to the inspection signal and load information indicating a load of the server 402-1. The control unit 515 monitors a response time and a load of the server 402-1 in accordance with the threshold value information 522 and temporarily distributes requests for the server 402-1 to the server 402-1 and the server 402-2 when the response time exceeds a threshold value corresponding to the load.

After that, the communication unit 511 receives load information indicating the load of the server 402-2 from the server 402-2. Next, the determination unit 516 determines whether failover from the server 402-1 to the server 402-2 is to be implemented, in accordance with the response time and the load of the server 402-1 and the load of the server 402-2.

Figure 6:
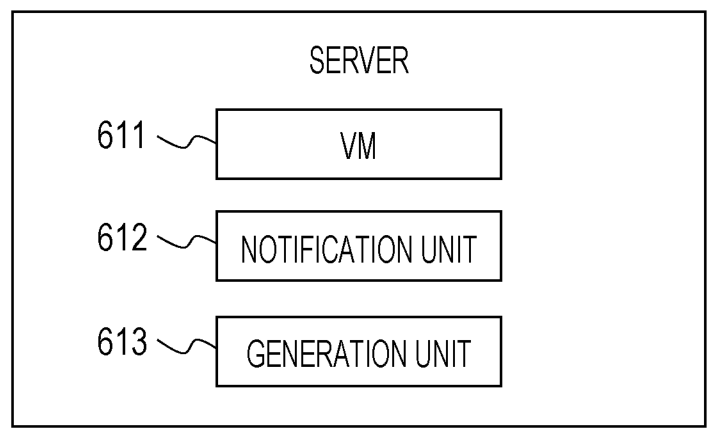
FIG. 6 is a diagram illustrating a first exemplary functional configuration of a server.

FIG. 6 illustrates a first exemplary functional configuration of a server 402-*i* (i=1,2) in FIG. 4. The server 402-*i* in FIG. 6 includes a VM 611, a notification unit 612, and a generation unit 613. The VM 611 processes requests received from the load balancer 401 and transmits responses to the requests to the load balancer 401. The notification unit 612 transmits load information indicating a load of the server 402-*i* to the load balancer 401. The generation unit 613 generates the VM 611 in accordance with an instruction from the load balancer 401.

Figure 7:
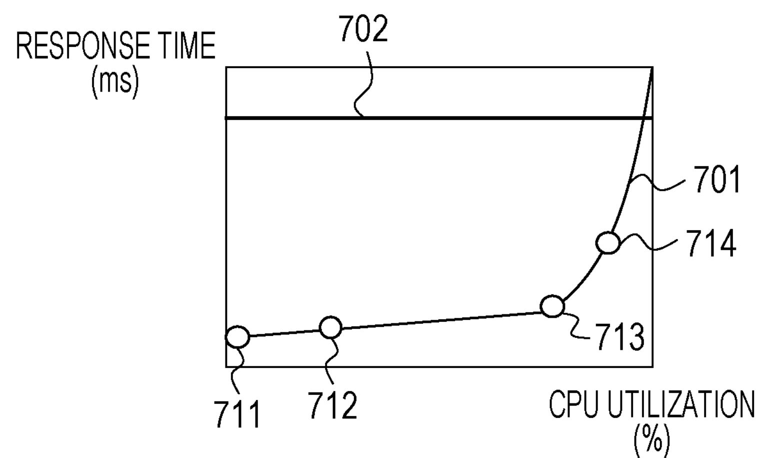
FIG. 7 is a diagram illustrating response time information.

FIG. 7 illustrates an example of the response time information 521. The horizontal axis of FIG. 7 represents a CPU utilization, and the vertical axis represents a response time. A curve 701 represents the response time information 521 and also represents a change in a response time with respect to a change in a CPU utilization. Points 711 to 714 represent results each of which is obtained by mapping a response time of a response received from the server 402-1 in the evaluation time period and a CPU utilization indicated by load information received together with the response. The calculation unit 514 generates the curve 701 connecting the points 711 to 714 by interpolating data between these points.

A straight line 702 represents a maximum allowable delay time independent of a CPU utilization, and is set, for example, by the user.

Figure 8:
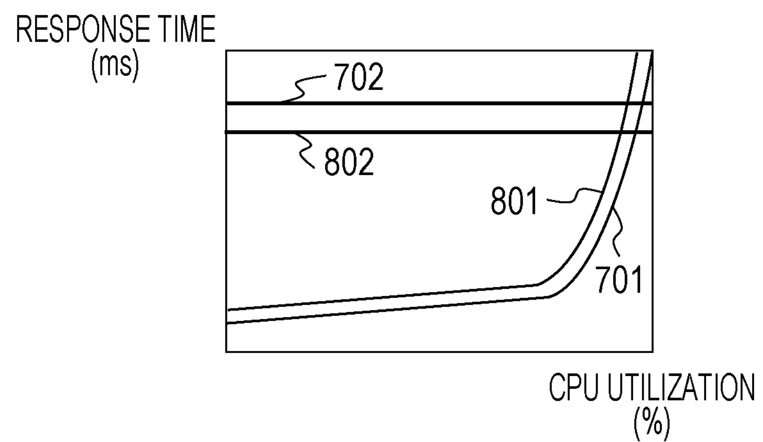
FIG. 8 is a diagram illustrating threshold value information.

FIG. 8 illustrates an example of the threshold value information 522. A curve 801 represents a threshold value T1 of a response time calculated from the curve 701 in FIG. 7, which is set at a value larger than the response time represented by the curve 701 by a certain ratio R1. The ratio R1 is set depending on a configuration or a condition of the information processing system, and may be, for example, in a range of 0% to 30%.

A straight line 802 represents a threshold value T2 of a response time calculated from the straight line 702 in FIG. 7, which is set at a value smaller than the response time represented by the straight line 702 by a certain ratio R2. The certain ratio R2 is set depending on a configuration or a condition of the information processing system, and may be, for example, in a range of 0% to 30%.

When the response time of the server 402-1 executes the threshold value T1 or the threshold value T2, the control unit 515 temporarily distributes requests to the server 402-1 and the server 402-2 and verifies changes in the loads. In addition, for example, when the following conditions are satisfied, the determination unit 516 determines that failover from the server 402-1 to the server 402-2 is to be implemented.

A first condition (C1) is that a CPU utilization of the server 402-2 is smaller than a CPU utilization of the server 402-1.

A second condition (C2) is that a response time of the server 402-1 exceeds the threshold value T1 or the threshold value T2.

The first condition (C1) indicates that the loads of the server 402-1 and the server 402-2 are unbalanced, and the second condition (C2) indicates that the CPU utilization of the server 402-1 does not decrease even when the distribution of requests is performed.

Figure 9:
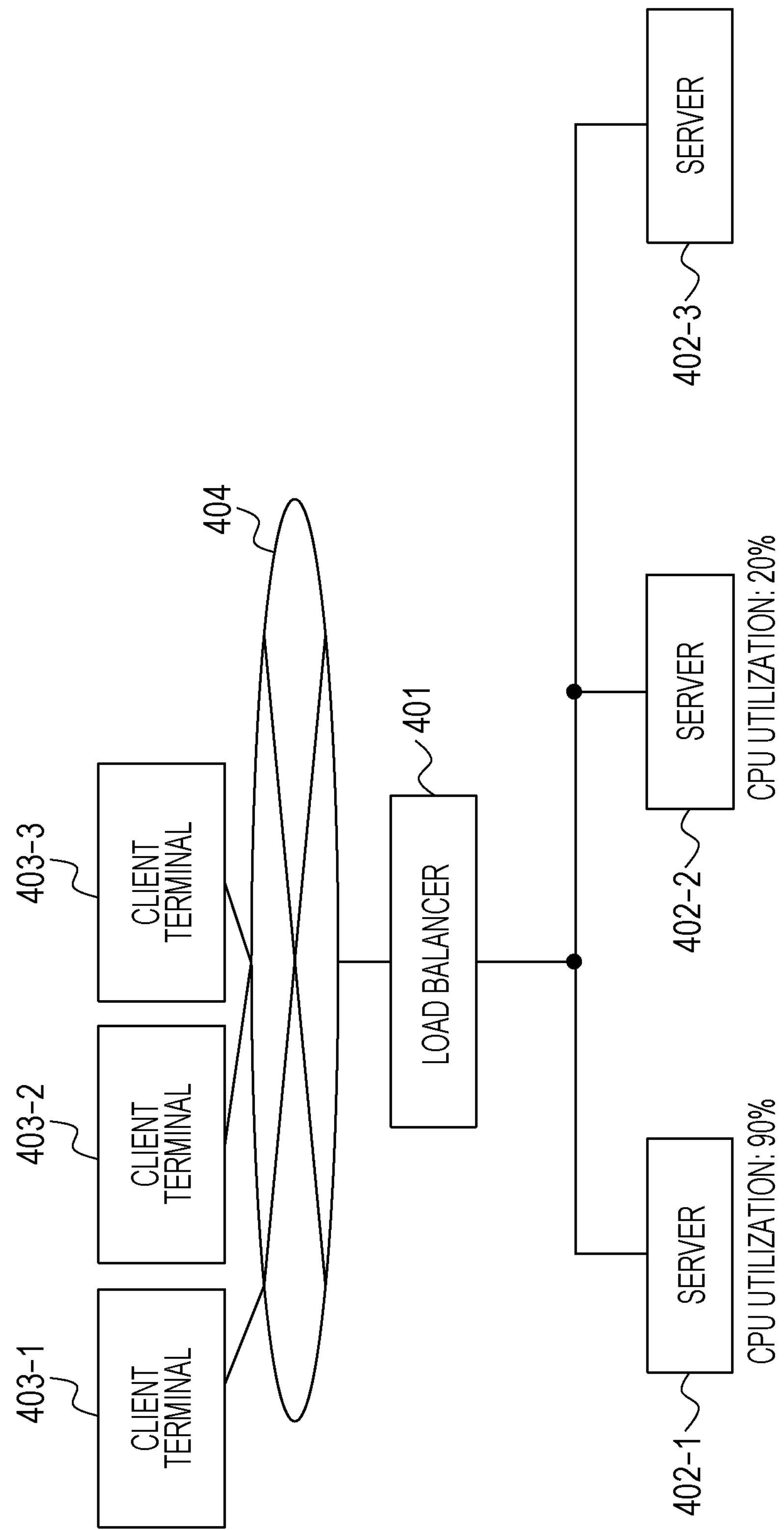
FIG. 9 is a diagram illustrating failover.

FIG. 9 illustrates an example of failover in the information processing system in FIG. 4. For example, when the CPU utilization of the server 402-1 is 90%, and the CPU utilization of the server 402-2 is 20%, the first condition (C1) is satisfied. In addition, when the second condition (C2) is also satisfied, the determination unit 516 determines that failover is to be implemented, and the control unit 515 stops transmission of requests to the VM of the server 402-1.

In addition, the selection unit 513 sets the server 402-2 as a working server, sets the VM of the server 402-2 as a working VM, and instructs the server 402-1 to delete the VM. In addition, the selection unit 513 sets a new server 402-3 as a backup server and instructs the server 402-3 to generate a VM. After that, monitoring of a response time and a load of the server 402-2 is started by using the VM of the server 402-2 as the new working VM and the VM of the server 402-3 as the new backup VM.

In such an information processing system, health check is conducted by using a variable allowable delay time corresponding to a load of the working server, and failover may be implemented at appropriate timing corresponding to the load.

In addition, even when the response time of the working server exceeds the allowable delay time, the failover is not implemented immediately; however, the failover may be implemented only after a decrease in the load is confirmed by verification of a change in the load in advance. As a result, only when an effect of failover is expected, the failover is implemented, and the information processing system is reliably restored.

Figure 10:
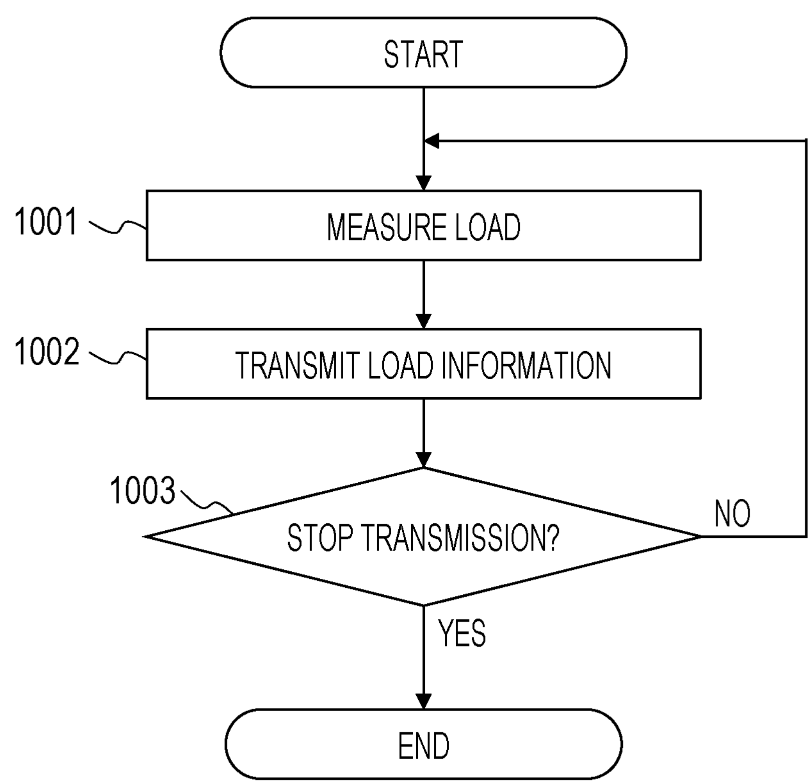
FIG. 10 is a flowchart illustrating load information notification processing.

FIG. 10 is a flowchart illustrating an example of load information notification processing executed by the notification unit 612 in FIG. 6. First, the notification unit 612 measures a load of the server 402-1 in response to reception of an inspection signal from the load balancer 401 (Step 1001) and transmits load information indicating the measured load to the load balancer 401 (Step 1002). Next, the notification unit 612 checks whether stop of transmission of load information has been instructed from the load balancer 401 (Step 1003).

When stop of transmission of the load information is not instructed (Step 1003, NO), the notification unit 612 repeats the processing in Step 1001 and the subsequent steps, and when stop of transmission of the load information has been instructed (Step 1003, YES), the notification unit 612 ends the processing.

Figure 11:
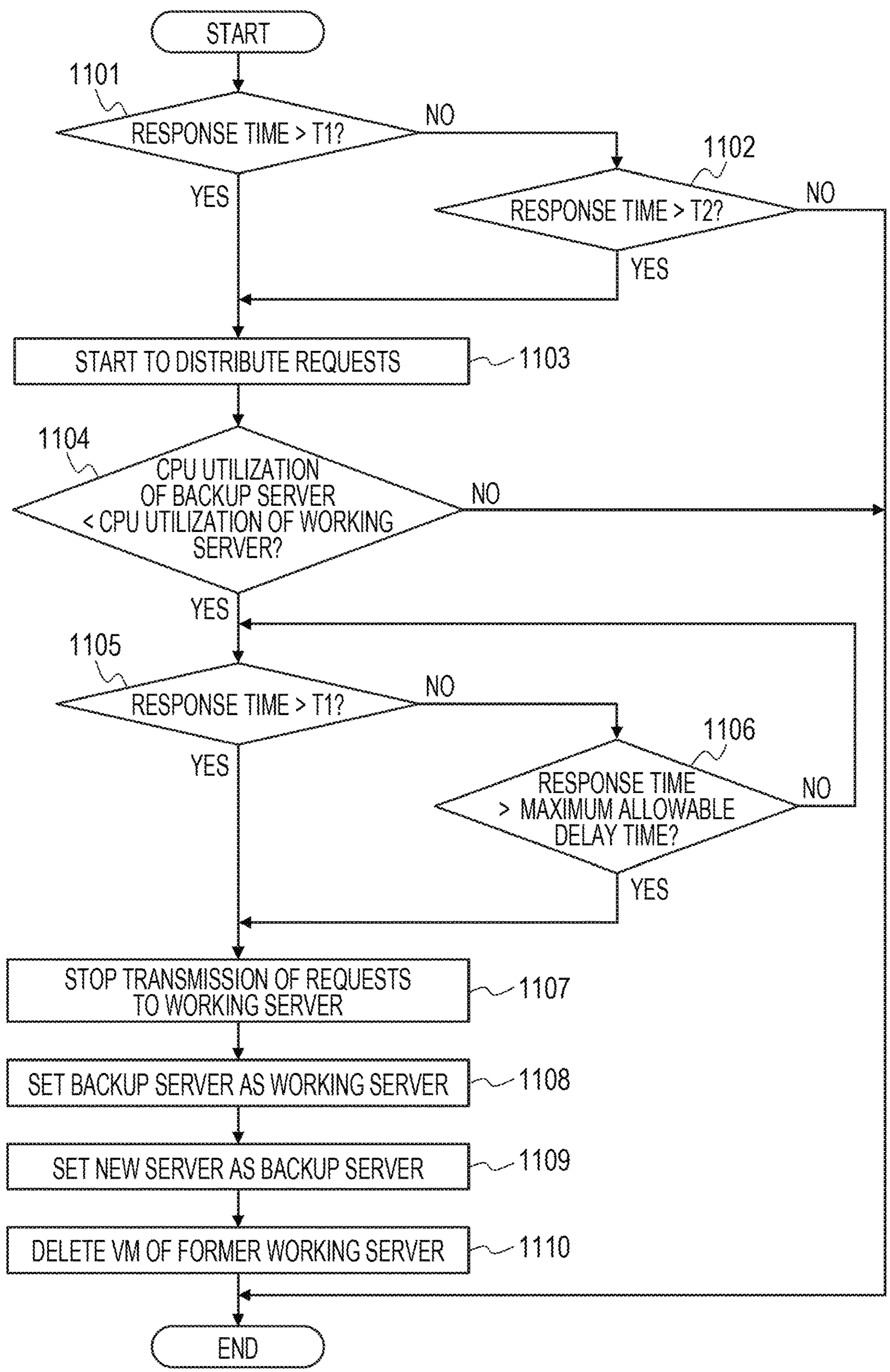
FIG. 11 is a flowchart illustrating first control processing.

FIG. 11 is a flowchart illustrating an example of first control processing executed by the load balancer 401 in FIG. 5. In the first control processing, the CPU utilization is used as the load information, and the threshold value T1 represented by the curve 801 and the threshold value T2 represented by the straight line 802 in FIG. 8 are used as the threshold value information 522.

First, the control unit 515 compares a response time of the VM of the server 402-1 that is the working server with the threshold value T1 corresponding to the CPU utilization of the server 402-1 (Step 1101). When the response time is longer than the threshold value T1 (Step 1101, YES), the control unit 515 starts control to distribute requests for the server 402-1 to the VM of the server 402-1 and the VM of the server 402-2 that is the backup server (Step 1103).

On the other hand, when the response time is the threshold value T1 or less (Step 1101, NO), the control unit 515 compares the response time with the threshold value T2 (Step 1102). When the response time is longer than the threshold value T2 (Step 1102, YES), the load balancer 401 executes the processing in Step 1103 and the subsequent steps. On the other hand, when the response time is the threshold value T2 or less (Step 1102, NO), the load balancer 401 ends the processing.

After the requests have been distributed to the server 402-1 and the server 402-2, the determination unit 516 compares the CPU utilization of the server 402-1 with the CPU utilization of the server 402-2 (Step 1104). When the CPU utilization of the server 402-2 is the CPU utilization of the server 402-1 or more (Step 1104, NO), the load balancer 401 ends the processing.

On the other hand, when the CPU utilization of the server 402-2 is smaller than the CPU utilization of the server 402-1 (Step 1104, YES), the determination unit 516 compares the response time of the VM of the server 402-1 with the threshold value T1 corresponding to the CPU utilization of the server 402-1 (Step 1105). When the response time is longer than the threshold value T1 (Step 1105, YES), the determination unit 516 determines that failover is to be implemented, and the control unit 515 stops transmission of requests to the VM of the server 402-1 (Step 1107).

Next, the selection unit 513 sets the server 402-2 as a working server and sets the VM of the server 402-2 as a working VM (Step 1108). Next, the selection unit 513 sets a new server 402-3 as a backup server and instructs the server 402-3 to generate a VM (Step 1109). In addition, the selection unit 513 instructs the server 402-1 that is the former working server to deletes the VM (Step 1110).

On the other hand, when the response time is the threshold value T1 or less (Step 1105, NO), the determination unit 516 compares the response time with the maximum allowable delay time (Step 1106). When the response time is longer than the maximum allowable delay time (Step 1106, YES), the load balancer 401 executes the processing in Step 1107 and the subsequent steps. On the other hand, when the response time is the maximum allowable delay time or less (Step 1106, NO), the load balancer 401 executes the processing in Step 1105 and the subsequent steps.

In the first control processing, after the distribution of requests has started, failover may be implemented when the load of the backup server is smaller than the load of the working server, and the response time of the working server exceeds the threshold value T1 or the maximum allowable delay time.

There is a case in which it is determined that there is no remarkable difference between the CPU utilizations of the server 402-1 and the server 402-2 because the performances of the VMs have reached the limit even after distribution of requests to the server 402-1 and the server 402-2. In this case, it is desirable to perform scale-up for the health of a backup server.

Figure 12:
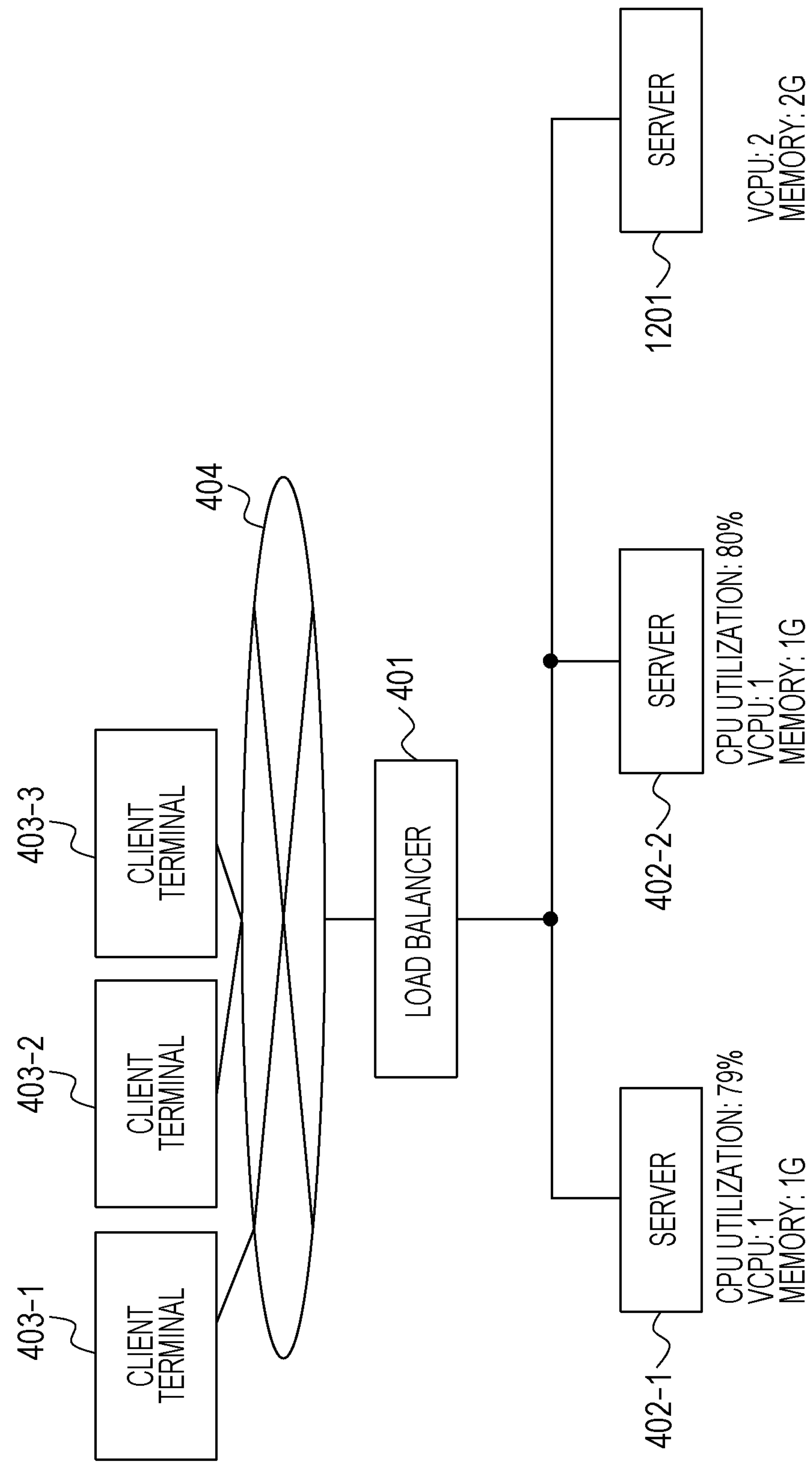
FIG. 12 is a diagram illustrating scale-up of a backup server.

FIG. 12 illustrates an example of scale-up of a backup server. In this example, each of the VMs of the server 402-1 and the server 402-2 includes a single virtual CPU (VCPU) and a 1G memory. When the CPU utilization of the server 402-1 becomes 79%, and the CPU utilization of the server 402-2 becomes 80% after distribution of requests to the VMs has started, a difference of the CPU utilizations is small, and therefore, it is determined that the performances of the VMs have reached the limit.

Therefore, the load balancer 401 instructs a new server 1201 to generate a VM having higher performance than that of the VM of the server 402-2, and the server 1201 generates a VM including two VCPUs and a 2 GB memory.

After that, the load balancer 401 starts control to distribute requests to the VM of the server 402-1 and the VM of the server 1201 by using the server 1201 as a new backup server. In addition, the load balancer 401 checks the CPU utilization of the server 1201 and determines whether failover from the server 402-1 to the server 1201 is to be implemented when the CPU utilization of the server 1201 becomes smaller than the CPU utilization of the server 402-2.

In addition, there may be a case in which it is determined that the CPU utilization of the server 402-2 is considerably larger than the CPU utilization of the server 402-1 because a failure occurs in the server 402-2 even after requests are distributed to the server 402-1 and the server 402-2. In this case, for the health of the backup server, it is desirable to exchange the server 402-2 with another backup server.

Figure 13:
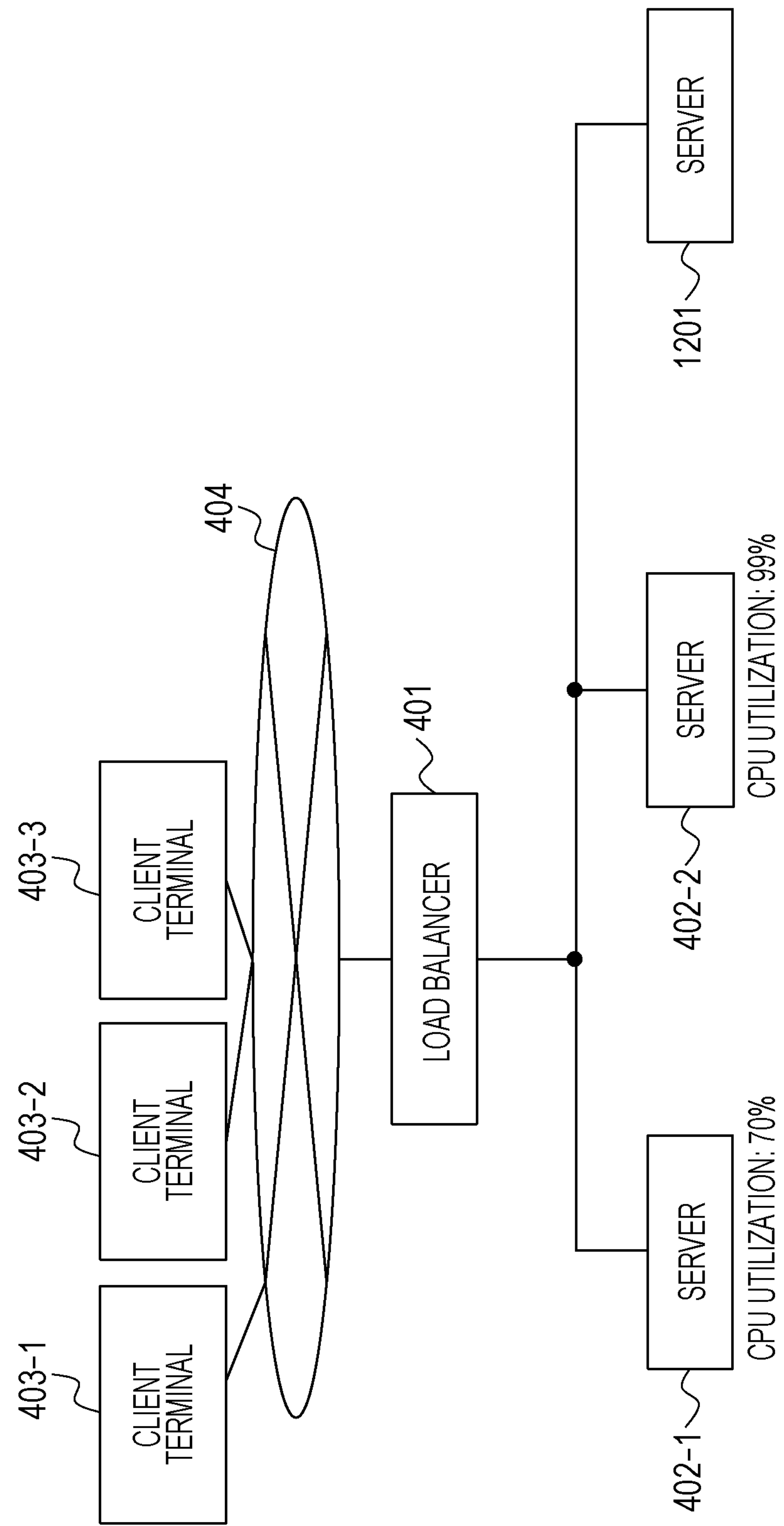
FIG. 13 is a diagram illustrating exchange of a backup server.

FIG. 13 illustrates an example of exchange of a backup server. In this example, after distribution of requests to the server 402-1 and the server 402-2 has started, the CPU utilization of the server 402-1 becomes 70%, and the CPU utilization of the server 402-2 becomes 99%. In this case, the CPU utilization of the server 402-2 is considerably larger than the CPU utilization of the server 402-1, and therefore, it is determined that a failure occurs in the server 402-2.

Therefore, the load balancer 401 instructs the new server 1201 to generate a VM, and then, the server 1201 generates a VM. After that, the load balancer 401 starts control to distribute requests to the VM of the server 402-1 and the VM of the server 1201 by using the server 1201 as a new backup server and checks the CPU utilizations of the server 402-1 and the server 1201. In addition, when the CPU utilization of the server 1201 becomes smaller than the CPU utilization of the server 402-1, the load balancer 401 determines whether failover from the server 402-1 to the server 1201 is implemented.

Figure 14A:
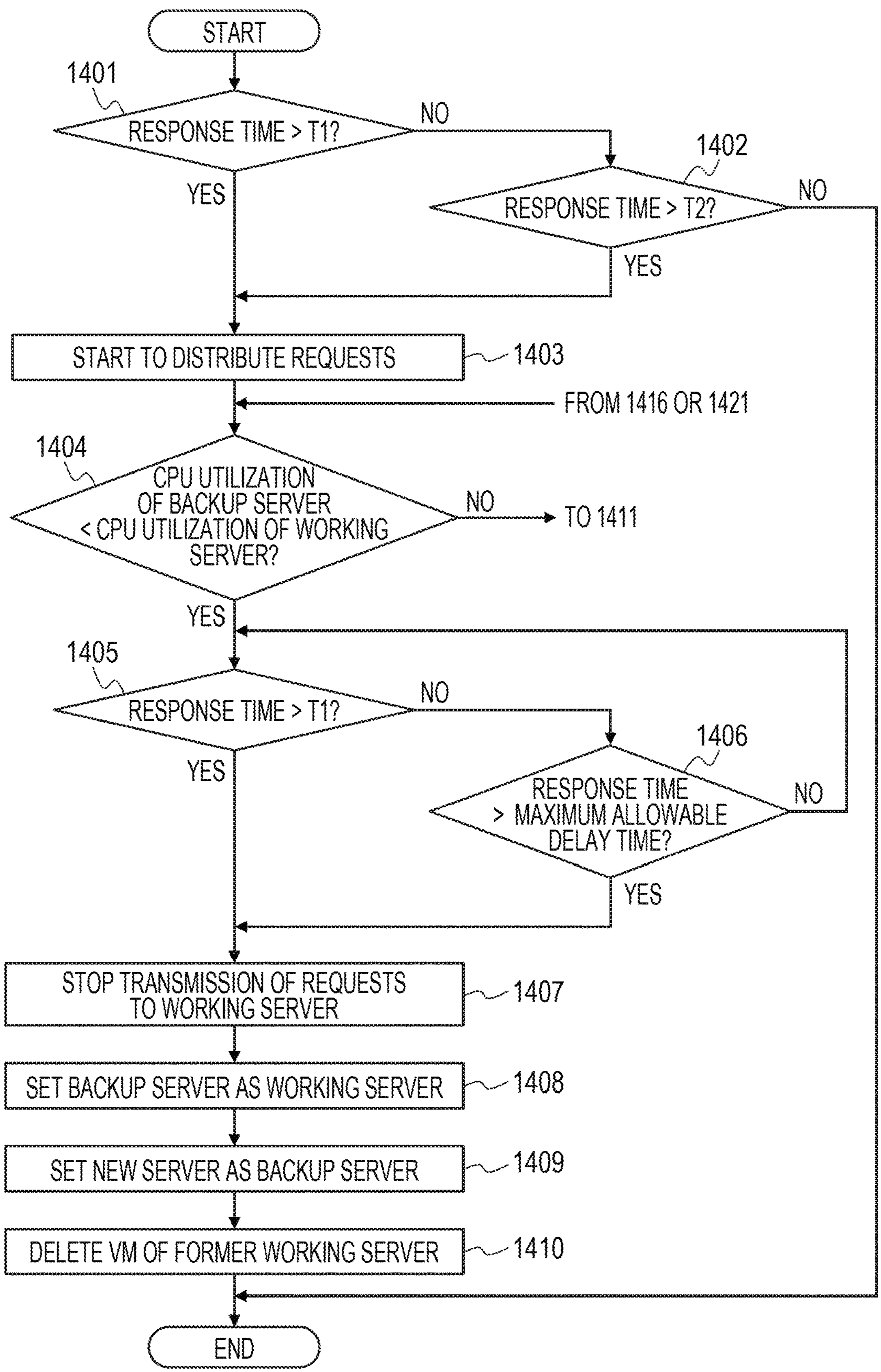
FIGS. 14A and 14B are flowcharts of second control processing.
Figure 14B:
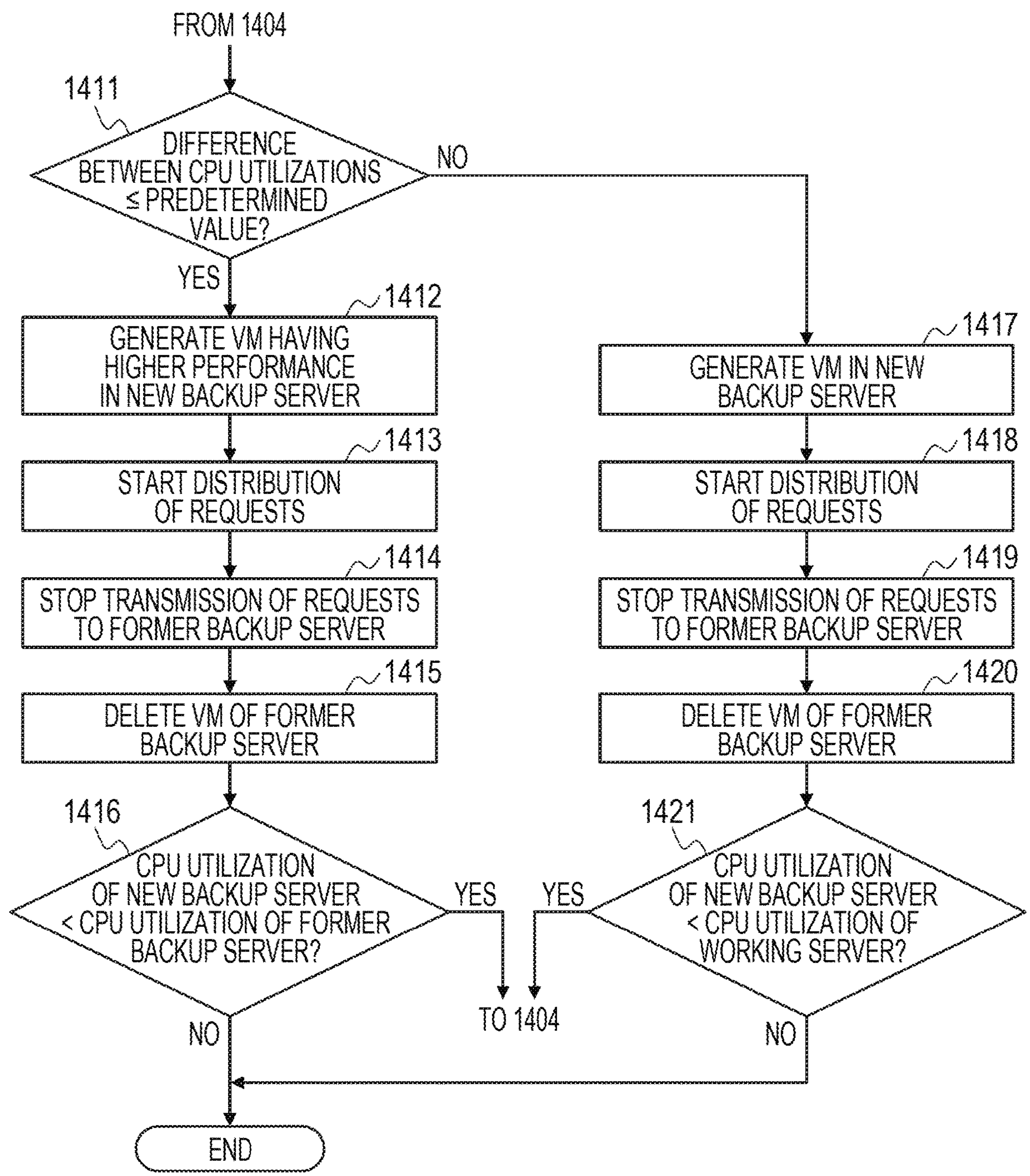

FIGS. 14A and 14B are flowcharts illustrating second control processing executed by the load balancer 401 in FIG. 5. In the second control processing, the processing of scale-up of a backup server and the processing of exchange of a backup server are added to the first control processing illustrated in FIG. 11. Processing in Steps 1401 to 1410 is similar to the processing in Steps 1101 to 1110 in FIG. 11.

In Step 1404, when the CPU utilization of the server 402-2 is the CPU utilization of the server 402-1 or more (Step 1404, NO), the control unit 515 compares a difference between the CPU utilizations with a predetermined value (Step 1411). For example, as the predetermined value, a value in a range of 1% to 10% may be used.

When the difference between the CPU utilizations is the predetermined value or less (Step 1411, YES), the selection unit 513 sets a new server 1201 as a new backup server and instructs the server 1201 to generate a VM having higher performance than that of the VM of the server 402-2 (Step 1412).

Next, the control unit 515 starts control to distribute requests to the VM of the server 402-1 and the VM of the server 1201 (Step 1413) and stops transmission of requests to the VM of the server 402-2 that is the former backup server (Step 1414).

Next, the selection unit 513 instructs the server 402-2 to delete the VM (Step 1415), and the control unit 515 compares the CPU utilization of the server 1201 with the CPU utilization of the server 402-2 in Step 1411 (Step 1416).

When the CPU utilization of the server 1201 is smaller than the CPU utilization of the server 402-2 (Step 1416, YES), the load balancer 401 executes the processing in Step 1404 and the subsequent steps. On the other hand, when the CPU utilization of the server 1201 is the CPU utilization of the server 402-2 or more (Step 1416, NO), the load balancer 401 ends the processing.

When the difference between the CPU utilizations is larger than the predetermined value (Step 1411, NO), the selection unit 513 sets the new server 1201 as the new backup server and instructs the server 1201 to generate a VM (Step 1417).

Next, the control unit 515 starts control to distribute requests to the VM of the server 402-1 and the VM of the server 1201 (Step 1418) and stops transmission of requests to the VM of the server 402-2 that is the former backup server (Step 1419).

Next, the selection unit 513 instructs the server 402-2 to delete the VM (Step 1420), and the control unit 515 compares the CPU utilization of the server 1201 with the CPU utilization of the server 402-1 that is the working server (Step 1421).

When the CPU utilization of the server 1201 is smaller than the CPU utilization of the server 402-1 (Step 1421, YES), the load balancer 401 executes the processing in Step 1404 and the subsequent steps. On the other hand, when the CPU utilization of the server 1201 is the CPU utilization of the server 402-1 or more (Step 1421, NO), the load balancer 401 ends the processing.

In the second control processing, when the load of the backup server is the load of the working server or more after distributions of requests has started, the load of the backup server may be reduced by scale-up or exchange of the backup server. As a result, failover may be implemented smoothly.

In Steps 1412 and 1417, the selection unit 513 may instruct the server 402-2 to generate a VM instead of the new server 1201. In this case, in the subsequent processing, the server 402-2 is used as a backup server instead of the server 1201.

Figure 15:
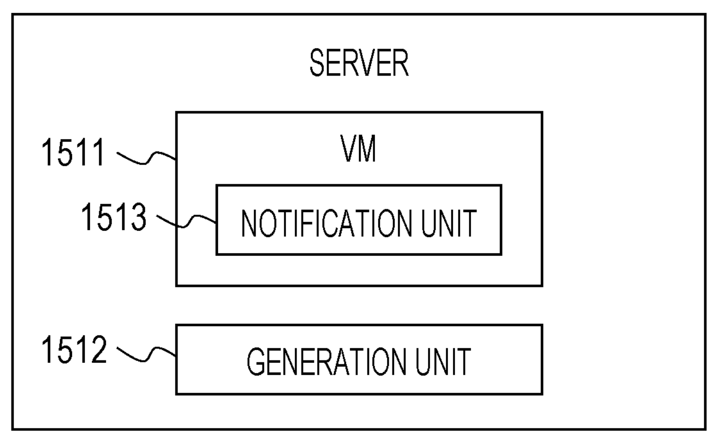
FIG. 15 is a diagram illustrating a second exemplary functional configuration of a server.

FIG. 15 illustrates a second exemplary functional configuration of the server **402-*i* in FIG. 4. The server 402-*i* in FIG. 15 includes a VM 1511 and a generation unit 1512 differently from the server 402-*i* in FIG. 6. The VM 1511 includes a notification unit 1513, and processes a request received from the load balancer 401 and transmits, to the load balancer 401, a response to the request. The notification unit 1513 transmits load information indicating a load of the server 402-*i* to the load balancer 401. The generation unit 1512 generates the VM 1511 in response to an instruction from the load balancer 401**.

In such a configuration of the server **402-*i*, the VM 1511 may transmit the load information to the load balancer 401**.

The configuration of the information processing device 201 in FIG. 2 is just an example, and some of the configuration elements may be omitted or changed depending on a usage or a condition of the information processing device 201.

The configurations of the information processing systems in FIGS. 1, 4, 9, 12, and 13 are just examples, and some of the configuration elements may be omitted or changed depending on a usage or a condition of the information processing system. For example, the number of working servers or the number of backup servers may be two or more.

The configuration of the load balancer 401 in FIG. 5 is just an example, and some of the configuration elements may be omitted or changed depending on a usage or a condition of the information processing system. The configurations of the servers **402-*i* in FIGS. 6 and 15** are just examples, and some of the configuration elements may be omitted or changed depending on a usage or a condition of the information processing system.

The flowcharts in FIGS. 3, 10, 11, 14A, and 14B are just examples, and some pieces of processing may be omitted or changed depending on a configuration or a condition of the information processing system. For example, when the maximum allowable delay time and the threshold value T2 are not set, Steps 1102 and 1106 of FIG. 11 and Steps 1402 and 1406 of FIG. 14A may be omitted.

In the control processing in FIG. 11, 14A, or 14B, a disk I/O amount, a load average, a traffic amount of a communication network, a memory or swap utilization, or the like, may be used as load information instead of a CPU utilization.

The response time information in FIG. 7 and the threshold value information in FIG. 8 are just examples, and the response time information and the threshold value information change depending on a configuration or a condition of the information processing system and the type of load information.

Figure 16:
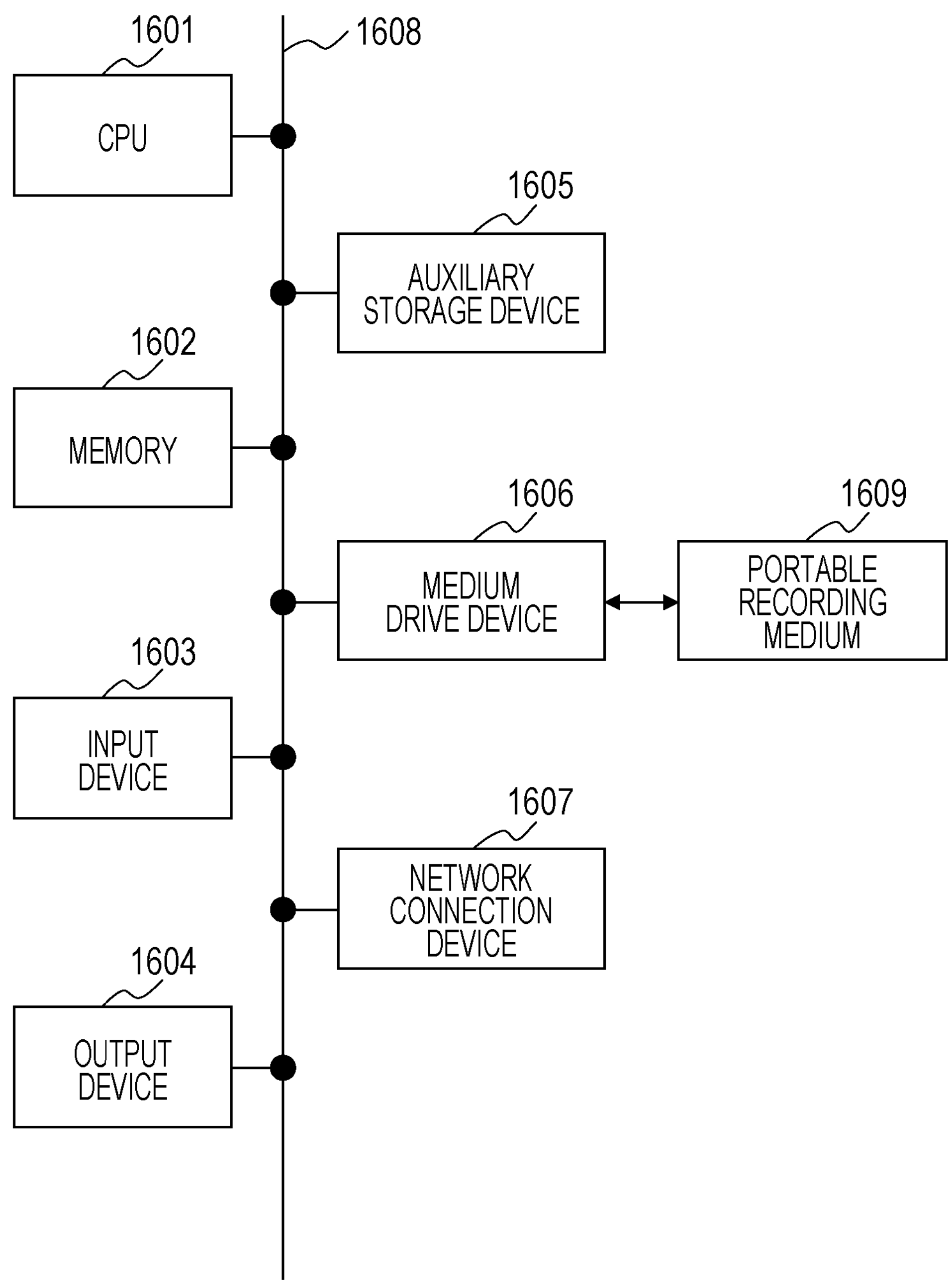
FIG. 16 is a diagram illustrating an exemplary hardware configuration of an information processing device.

FIG. 16 illustrates an exemplary hardware configuration of the information processing device (computer) used as the information processing device 201 in FIG. 2 or the load balancer 401 in FIG. 5. The information processing device in FIG. 16 includes a CPU 1601, a memory 1602, an input device 1603, an output device 1604, an auxiliary storage device 1605, a medium drive device 1606, and a network connection device 1607. These configuration elements are coupled to each other a bus 1608.

The memory 1602 is, for example, a semiconductor memory such as a read only memory (ROM), a random access memory (RAM), or a flash memory, and stores programs and data used for the processing. The memory 1602 may be used as the storage unit 512 in FIG. 5.

The CPU 1601 (processor) operates, for example, as the calculation unit 212, the control unit 213, and the determination unit 214 in FIG. 2 by executing a program by using the memory 1602. The CPU 1601 also operates as the selection unit 513, the calculation unit 514, the control unit 515, and the determination unit 516 in FIG. 5 by executing a program by using the memory 1602.

The input device 1603 is, for example, a keyboard, a pointing device, or the like, and is used for input of information or an instruction from an operator or a user. The output device 1604 is, for example, a display device, a printer, a speaker, or the like, and is used for output of an inquiry or an instruction to the operator or the user, and a processing result.

The auxiliary storage device 1605 is, for example, a magnetic disk device, an optical disk device, an optical magnetic disk device, a tape device, or the like. The auxiliary storage device 1605 may be a hard disk drive. The information processing device may store programs and data in the auxiliary storage device 1605 and use the programs and data by loading the programs and data into the memory 1602. The auxiliary storage device 1605 may be used as the storage unit 512 in FIG. 5.

The medium drive device 1606 drives a portable recording medium 1609 and accesses a record content of the portable recording medium 1609. The portable recording medium 1609 is a memory device, a flexible disk, an optical disk, an optical magnetic disk, or the like. The portable recording medium 1609 may be a compact disk read only memory (CD-ROM), a digital versatile disk (DVD), a universal serial bus (USB) memory, or the like. The operator or the user stores programs and data in the portable recording medium 1609 and may use the programs and data by loading the programs and data into the memory 1602.

As described above, a computer-readable recording medium that stores programs and data used for the processing is a physical (non-transitory) recording medium such as the memory 1602, the auxiliary storage device 1605, or the portable recording medium 1609.

The network connection device 1607 is a communication interface circuit that is coupled to a communication network such as a local area network (LAN) or a wide area network (WAN) and performs data conversion accompanying the communication. The information processing device receives programs and data from an external device through the network connection device 1607 and may use the programs and data by loading the programs and data into the memory 1602. The network connection device 1607 may be used as the communication unit 211 in FIG. 2 or the communication unit 511 in FIG. 5.

The information processing device may not include all of the configuration elements in FIG. 16, and some of the configuration elements may be omitted depending on a usage or a condition. For example, when an interface with the user or the operator is unnecessary, the input device 1603 and the output device 1604 may be omitted. In addition, when the portable recording medium 1609 is not used, the medium drive device 1606 may be omitted.

The information processing device in FIG. 16 may be used as the server 402-*i* in FIG. 6. In this case, the CPU 1601 executes a program by using the memory 1602 so as to operate as the notification unit 612 and the generation unit 613 and operates the VM 611.

The information processing device in FIG. 16 may also be used as the server 402-*i* in FIG. 15. In this case, the CPU 1601 executes a program by using the memory 1602 so as to operate as the generation unit 1512 and operates the VM 1511 and the notification unit 1513.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:

a memory; and a processor coupled to the memory and the processor configured to:

repeat, for a predetermined time period, transmission of an inspection signal to a first device and reception of load information indicating a load of the first device in response to the inspection signal;

calculate, for each load of the first device, a threshold value of a response time of the first device for an inspection signal based on each piece of the load information received in the predetermined time period and a response time for receiving each piece of the load information;

distribute, to the first device and a second device, requests to the first device when a response time of the first device for receiving load information in response to an inspection signal transmitted after the predetermined time period elapses exceeds a threshold value corresponding to a load indicated by the received load information; and determine whether to switch from the first device to the second device based on a result obtained by comparing a first load indicated by load information received from the first device with a second load indicated by load information received from the second device after the requests are distributed to the first device and the second device.

2. The information processing device according to claim 1, wherein the processor is further configured to determine whether to switch from the first device to the second device when the second load is smaller than the first load and when a response time of the first device exceeds a threshold value corresponding to the first load.

3. The information processing device according to claim 1, wherein the processor is further configured to:

distribute requests, for processing by the first device, to the first device and a third device when the second load is larger than the first load and a difference between the second load and the first load is larger than a predetermined value; and determine whether to switch from the first device to the third device based on a result obtained by comparing a load indicated by load information received from the first device with a load indicated by load information received from the third device after the requests are distributed to the first device and the third device.

4. The information processing device according to claim 3, wherein the processor is further configured to:

distribute requests for the first device to a first virtual machine that operates in the first device and a second virtual machine that operates in the third device and that has a higher performance than a performance of the first virtual machine, when the second load is larger than the first load and a difference between the second load and the first load is the predetermined value or less; and determine whether to switch from the first device to the third device based on a result obtained by comparing a load indicated by load information received from the first device with a load indicated by load information received from the third device after the requests are distributed to the first virtual machine and the second virtual machine.

5. An information processing system comprising:

a first device;

a second device; and an information processing device including:

a memory; and a processor coupled to the memory and the processor configured to:

repeat, for a predetermined time period, transmission of an inspection signal to the first device and reception of load information indicating a load of the first device in response to the inspection signal;

calculate, for each load of the first device, a threshold value of a response time of the first device for an inspection signal based on each piece of the load information received in the predetermined time period and a response time for receiving each piece of the load information;

distribute, to the first device and the second device, requests to the first device when a response time of the first device for receiving load information in response to an inspection signal transmitted after the predetermined time period elapses exceeds a threshold value corresponding to a load indicated by the received load information; and determine whether to switch from the first device to the second device based on a result obtained by comparing a first load indicated by load information received from the first device with a second load indicated by load information received from the second device after the requests are distributed to the first device and the second device.

6. The information processing system according to claim 5, wherein the processor is further configured to determine whether to switch from the first device to the second device when the second load is smaller than the first load and when a response time of the first device exceeds a threshold value corresponding to the first load.

7. The information processing system according to claim 5, wherein the processor is further configured to:

distribute requests, for processing by the first device, to the first device and a third device when the second load is larger than the first load and a difference between the second load and the first load is larger than a predetermined value; and determine whether to switch from the first device to the third device based on a result obtained by comparing a load indicated by load information received from the first device with a load indicated by load information received from the third device after the requests are distributed to the first device and the third device.

8. The information processing system according to claim 7, wherein the processor is further configured to:

distribute requests for the first device to a first virtual machine that operates in the first device and a second virtual machine that operates in the third device and that has a higher performance than a performance of the first virtual machine, when the second load is larger than the first load and a difference between the second load and the first load is the predetermined value or less; and determine whether to switch from the first device to the third device based on a result obtained by comparing a load indicated by load information received from the first device with a load indicated by load information received from the third device after the requests are distributed to the first virtual machine and the second virtual machine.

9. A non-transitory computer-readable recording medium having stored therein a program that causes a computer to execute a process, the process comprising:

repeating, for a predetermined time period, transmission of an inspection signal to a first device and reception of load information indicating a load of the first device in response to the inspection signal;

calculating, for each load of the first device, a threshold value of a response time of the first device for an inspection signal based on each piece of the load information received in the predetermined time period and a response time for receiving each piece of the load information;

distributing, to a virtual machine of the first device and a virtual machine of a second device, requests to the first device when a response time of the first device for receiving load information in response to an inspection signal transmitted after the predetermined time period elapses exceeds a threshold value corresponding to a load indicated by the received load information; and determining whether to switch from the first device to the second device based on a result obtained by comparing a first load indicated by load information received from the first device with a second load indicated by load information received from the second device after the requests are distributed to the first device and the second device.

10. The non-transitory computer-readable recording medium according to claim 9, the process further comprising:

determining whether to switch from the first device to the second device when the second load is smaller than the first load and when a response time of the first device exceeds a threshold value corresponding to the first load.

11. The non-transitory computer-readable recording medium according to claim 9, the process further comprising:

distributing requests, for processing by the first device, to the first device and a third device when the second load is larger than the first load and a difference between the second load and the first load is larger than a predetermined value; and determining whether to switch from the first device to the third device based on a result obtained by comparing a load indicated by load information received from the first device with a load indicated by load information received from the third device after the requests are distributed to the first device and the third device.

12. The non-transitory computer-readable recording medium according to claim 11, the process further comprising:

distributing requests for the first device to a first virtual machine that operates in the first device and a second virtual machine that operates in the third device and that has a higher performance than a performance of the first virtual machine, when the second load is larger than the first load and a difference between the second load and the first load is the predetermined value or less; and determining whether to switch from the first device to the third device based on a result obtained by comparing a load indicated by load information received from the first device with a load indicated by load information received from the third device after the requests are distributed to the first virtual machine and the second virtual machine.

* * * * *